United States Patent
Zyman Beer et al.

(10) Patent No.: US 9,080,910 B1
(45) Date of Patent: Jul. 14, 2015

(54) TACTILE HANDLE INTEGRATED SCALE

(71) Applicants: Jacobo Zyman Beer, Huixquilucan (MX); Alex Zyman, San Diego, CA (US)

(72) Inventors: Jacobo Zyman Beer, Huixquilucan (MX); Alex Zyman, San Diego, CA (US)

(*) Notice: Subject to any disclaimer, the term of this patent is extended or adjusted under 35 U.S.C. 154(b) by 0 days.

(21) Appl. No.: 14/640,109

(22) Filed: Mar. 6, 2015

(51) Int. Cl.
*A45C 13/28* (2006.01)
*G09B 21/00* (2006.01)
*G01G 19/52* (2006.01)
*G01G 19/58* (2006.01)
*G01G 23/20* (2006.01)

(52) U.S. Cl.
CPC .............. *G01G 19/58* (2013.01); *A45C 13/28* (2013.01); *G01G 19/52* (2013.01); *G01G 23/20* (2013.01); *G01G 23/206* (2013.01); *G09B 21/003* (2013.01)

(58) Field of Classification Search
CPC ..... G01G 23/18; G01G 23/20; G01G 23/206; G01G 19/56; G01G 19/58; G01G 3/02; G01G 3/04; G01G 19/00; G01G 19/52; A45C 13/28; A45F 3/04; G09B 21/003
USPC .................................. 116/205, 299
See application file for complete search history.

(56) References Cited

U.S. PATENT DOCUMENTS

| | | | | |
|---|---|---|---|---|
| 1,104,618 A | * | 7/1914 | Christianson | 5/14 |
| 1,221,673 A | * | 4/1917 | Canty | 177/149 |
| 2,177,234 A | * | 10/1939 | Walser | 368/77 |
| 2,492,257 A | * | 12/1949 | Barton | 177/48 |
| 2,518,973 A | * | 8/1950 | Atherton | 190/102 |
| 2,710,083 A | * | 6/1955 | White | 190/102 |
| 2,713,982 A | * | 7/1955 | Sherbrooke | 248/542 |
| 2,759,577 A | * | 8/1956 | White | 190/102 |
| 2,937,016 A | * | 5/1960 | Westman | 177/156 |
| 3,090,454 A | * | 5/1963 | Farrar et al. | 177/131 |
| 3,229,780 A | * | 1/1966 | Hanssen | 177/233 |
| 3,648,647 A | * | 3/1972 | Joy | 116/205 |
| 4,454,831 A | * | 6/1984 | Gallo | 116/200 |
| 4,969,644 A | | 11/1990 | Hlaing | |
| 5,319,162 A | | 6/1994 | Ness | |
| 5,416,279 A | | 5/1995 | Tseng | |
| 5,775,252 A | * | 7/1998 | Kilgore | 116/205 |

(Continued)

FOREIGN PATENT DOCUMENTS

CN 101692944 A 4/2010
WO 9859223 A1 12/1998

(Continued)

OTHER PUBLICATIONS

International Search Report (PCT 2012/060922), Dated Mar. 19, 2013, 10 pages.

(Continued)

*Primary Examiner* — Randy W Gibson
(74) *Attorney, Agent, or Firm* — ARC IP Law, PC; Joseph J. Mayo

(57) ABSTRACT

A tactile handle integrated scale that measures the weight of an attached element and provides tactile output. The handle with an integrated scale can be attached onto luggage, a briefcase, a backpack, or other liftable objects. The scale provides tactile output and a tactile gauge, so that users can ascertain the weight using touch only and without requiring visual inspection of the gauge. A switch may be provided to enable or disable the measurement feature of the handle. The handle may be attached to the liftable object using linkages that permit rotation of the object relative to the handle.

18 Claims, 7 Drawing Sheets

(56) References Cited

U.S. PATENT DOCUMENTS

| | | | |
|---|---|---|---|
| 5,996,180 A | 12/1999 | Eisenzopf | |
| 7,079,454 B2 * | 7/2006 | Wellen | 368/230 |
| 7,156,918 B2 | 1/2007 | Marks | |
| 7,281,615 B2 | 10/2007 | Siwak et al. | |
| 7,282,653 B2 | 10/2007 | Marks | |
| 7,404,506 B1 * | 7/2008 | Ross | 224/576 |
| 8,485,329 B1 * | 7/2013 | Roy et al. | 190/116 |
| 8,575,500 B1 * | 11/2013 | Genet, Sr. | 177/148 |
| 8,716,610 B2 | 5/2014 | Zyman Beer et al. | |
| 8,766,111 B2 * | 7/2014 | Lee | 177/126 |
| 2002/0129628 A1 | 9/2002 | Skalberg | |
| 2005/0051586 A1 * | 3/2005 | Siwak et al. | 224/576 |
| 2005/0189152 A1 * | 9/2005 | Lee | 177/148 |
| 2005/0224261 A1 * | 10/2005 | Marks | 177/131 |
| 2006/0086541 A1 * | 4/2006 | Khan et al. | 177/45 |
| 2007/0007048 A1 * | 1/2007 | Gill | 177/131 |
| 2007/0056779 A1 | 3/2007 | Laniado et al. | |
| 2007/0193786 A1 * | 8/2007 | Pohl et al. | 177/25.15 |
| 2007/0261213 A1 | 11/2007 | Nolan et al. | |
| 2007/0272449 A1 * | 11/2007 | Ogunnaike | 177/25.18 |
| 2008/0011568 A1 * | 1/2008 | Siwak et al. | 190/115 |
| 2008/0072404 A1 | 3/2008 | Wetter | |
| 2008/0185409 A1 | 8/2008 | Kellenberger | |
| 2009/0057037 A1 * | 3/2009 | Muniz et al. | 177/131 |
| 2010/0116559 A1 | 5/2010 | Moon | |
| 2010/0181354 A1 | 7/2010 | Laniado | |
| 2013/0037363 A1 * | 2/2013 | Palmer | 190/115 |
| 2013/0049391 A1 * | 2/2013 | Kurogi et al. | 296/30 |
| 2013/0140097 A1 | 6/2013 | Zyman Beer et al. | |
| 2014/0102813 A1 * | 4/2014 | Lin | 177/126 |

FOREIGN PATENT DOCUMENTS

| | | |
|---|---|---|
| WO | 2003100360 A1 | 12/2003 |
| WO | 2005092676 A1 | 10/2005 |
| WO | 2011048518 A1 | 4/2011 |
| WO | 2013081736 A1 | 6/2013 |

OTHER PUBLICATIONS

European Search report (PCT 2012/060922), Dated Nov. 27, 2014, 7 pages.

* cited by examiner

TACTILE HANDLE INTEGRATED SCALE

BACKGROUND OF THE INVENTION

1. Field of the Invention

One or more embodiments setting forth the ideas described throughout this disclosure pertain to the field of weight measurement devices. More particularly, but not by way of limitation, one or more aspects of the disclosure enable a tactile handle integrated scale. Such a handle with an integrated scale may be attached to luggage, a backpack, a container, or any other object that can be lifted, pulled, or transported, and provide a weight measurement when the attached object is lifted by the handle. One or more embodiments employ tactile outputs so that weight values can be determined using touch.

2. Description of the Related Art

Straps or handles with integrated scales are well-known in the art. For example, Laniado in US Patent Publication US 2007/0056779 teaches a backpack with shoulder straps having integrated scales. These scales use torsion springs coupled to a moveable weight indicator with weight gauges coupled to the shoulder straps. Similarly Siwak in U.S. Pat. No. 7,281,615 teaches a scale integrated into a luggage handle, which uses coil springs to measure the weight of the luggage.

Mechanisms known in the art for integrating weight measurement devices into handles have used visual outputs to indicate the measured weight. For example, Laniado teaches shoulder straps with scales that display measured weight using a pointer and a set of markers for the weight, much like an analog scale. Laniado also comments that output may be via a digital display. Siwak also teaches scales with analog output, using for example colored bands, or with digital output. In all known mechanisms for handle integrated scales, the output of the measurement is interpreted visually. A user must examine the scale and the gauge to determine the weight of the item attached to the handle.

A limitation of existing handle integrated scales is that they are not usable by people with vision impairments who are unable to easily read the scale output. Users with adequate vision may also find it inconvenient in some cases to have to examine the scale to determine the weight, for example in dark conditions.

For at least the limitations described above there is a need for a tactile handle integrated scale with tactile output so that users can determine the weight without looking at a visual output.

BRIEF SUMMARY OF THE INVENTION

At a high-level the disclosure set forth herein is directed to a tactile handle integrated scale. Utilizing this system enables a user to weigh an object that is attached to the tactile handle integrated scale by measuring the force exerted on the scale as it is lifted by the handle. The handle provides tactile measurements that can be discerned by the user with the sense of touch and for example without looking at the scale. In addition, one or more embodiments enables the scale feature to be locked, so that the handle does not display or output any measurement values.

The tactile handle integrated scale is meant to provide the user with a convenient method of weighing an object without the need to attach a separate weighing device or visual inspection thereof. As a result of the scale being handle integrated, the user may assess the weight at any moment. As in the case with personal luggage, one may not have access to a scale when it is necessary, such as on vacation. Because of the stringent weight limits set on items such as, but not limited to, personal luggage, one must be able to weigh one's own items or potentially pay for excess weight fees.

The tactile handle integrated scale may be attached to any object that requires knowledge of its weight. The tactile handle integrated scale may be attached at the natural spot or spots where a traditional handle would be attached. In addition to adding the convenience of allowing weight measurements, the tactile handle integrated scale will allow the user to carry and transport the object more easily.

In one or more embodiments the tactile handle integrated scale may be attached at two ends to the liftable element. These two ends define an axis that extends between them, called the longitudinal axis of the handle. A vertical axis extends from the liftable element towards the handle, and a transverse axis is perpendicular to the longitudinal axis and the vertical axis. In some embodiments the handle may attach at more than two or fewer than two points to the liftable element.

Embodiments of the invention incorporate a force detection element into the handle to provide an integrated scale. This force detection element may include mechanisms such as extension or compression springs, elastic cords or bands, torsion springs, gas or liquid pistons, piezoelectric sensors, or any other devices that can measure an attached weight. The force detection element has one or more measurable physical properties that change as a function of the force on the element. Such properties may include, for example, length, width, size, shape, temperature, electrical resistance, or any other property affected by force. The force detector is coupled to a force indicator that indicates the amount of force detected. This force indicator includes one or more tactile features so that the position and force reading of the force indicator can be determined using touch. Such features may include for example size, shape, texture, elasticity, or any combination of these elements. For example, in some embodiments the tactile force indicator may include a protrusion that extends out of the handle, whose location can be felt easily by the user, for example without requiring that the user obtain scale values visually.

One or more embodiments may include a gauge integrated into the handle with one or more tactile level indicators. Each level indicator corresponds to a particular value or range of the detected force. The level indicators may include tactile elements that allow a user to determine the level using touch. These tactile features may include for example the shape, size, texture, or elasticity of the level indicator. For example, a tactile level indicator may include a recessed slot or raised ridge on the handle whose length or size is proportional to the weight at that level. Tactile level indicators in some embodiments may include braille symbols or similar markings that let users read the indicator using touch. Braille symbols or similar markings may also be provided on the tactile force indicator.

One or more embodiments may include features that support the load of the attached weight once it reaches a threshold, to prevent an excessive weight from being applied to the force detector. For example, embodiments may incorporate a limiting surface into the handle that the force indicator contacts at a threshold weight, preventing further movement of the force indicator and supporting the load of the attached object. Such features may also provide a safety mechanism to support the attached object if the force detector breaks.

In one or more embodiments of the invention, the force detection element may be internal to the handle. For example, a handle may have an outer housing with a compression or extension spring inside the housing. Placing the force detection element inside the handle may provide potentially greater compactness, reliability and user safety.

In one or more embodiments, the handle may include a moveable switch that can enable or disable measurement of the attached weight. When the switch is in the measurement-on position, the attached load is applied to the force detection element, and the weight is reported by the force indicator. When the switch is in the measurement-off position, e.g., the locked position, the force detection element is uncoupled from the load, and a different load-bearing mechanism is switched into place. In some embodiments the moveable switch may have common parts with the force detection element.

In one or more embodiments of the invention, the tactile handle integrated scale may be attached to the liftable object using linkages that support rotation around one or more axes. For example, two ends of the handle may be attached to the object with revolute joints whose long axes lie along either the longitudinal or transverse axis of the handle. Some embodiments may use linkages that permit rotation around multiple axes. In one or more embodiments, a dual rotation linkage may be used for one end of the handle that includes a cylindrical bolt fitting in a through-hole along the longitudinal axis, providing for rotation of the handle around this longitudinal axis. In such a dual-rotation linkage, the through-hole in one or more embodiments may be wider at the ends of the hole than in the middle, allowing the handle to tilt partially around the transverse axis as well. This dual rotation linkage assists with force measurement for embodiments where one end of the handle needs to expand or contract as a function of the weight of the attached object, since this expansion or contraction naturally tilts the attached object relative to the handle.

BRIEF DESCRIPTION OF THE DRAWINGS

The above and other aspects, features and advantages of the ideas conveyed through this disclosure will be more apparent from the following more particular description thereof, presented in conjunction with the following drawings wherein.

DETAILED DESCRIPTION

A tactile handle integrated scale will now be described. In the following exemplary description numerous specific details are set forth in order to provide a more thorough understanding of the ideas described throughout this specification. It will be apparent, however, to an artisan of ordinary skill that embodiments of ideas described herein may be practiced without incorporating all aspects of the specific details described herein. In other instances, specific aspects well known to those of ordinary skill in the art have not been described in detail so as not to obscure the disclosure. Readers should note that although examples of the innovative concepts are set forth throughout this disclosure, the claims, and the full scope of any equivalents, are what define the invention.

Figure 1:
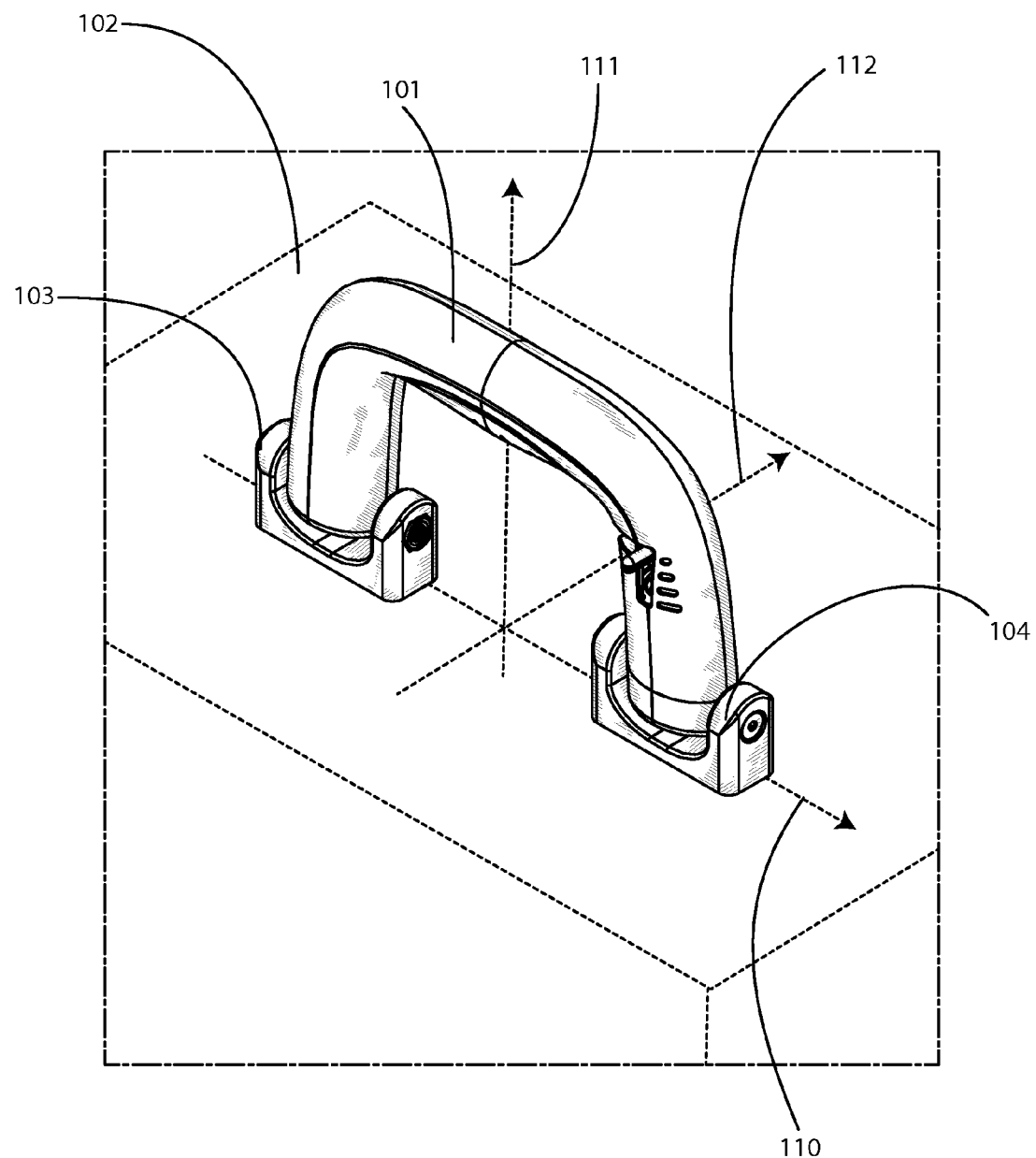
FIG. 1 illustrates a perspective view of an embodiment of a tactile handle integrated scale attached to an object such as a suitcase.

FIG. 1 illustrates a perspective view of an embodiment of the invention with tactile handle integrated scale 101. Handle 101 is attached to liftable element 102. Embodiments of the invention may be attached to any type of object, including for example luggage, backpacks, briefcases, carrying containers, sports equipment, or more generally any object that can be lifted, transported, pulled, pushed, moved, stretched, or weighed. In the embodiment shown, handle 101 attaches at two sides to liftable element 102. In the embodiment shown, the left side of handle 101 has a left U-shaped mounting block 103, and the right side of handle 101 has a right U-shaped mounting block 104; these U-shaped mounting blocks are attached to the liftable element. Other embodiments may attach to the liftable element at more than two sides, or at only one side, and they may use other shapes, sizes, and configurations for mounting blocks. Handle 101 may include para-aramid synthetic fiber, such as KEVLAR®, leather, plastic, polyester, polyvinyl chloride "PVC", nylon, styrene, rubber, steel, steel composite, carbon fiber, aluminum, any metals or alloys, or any other object or material that may support liftable element 102 for example.

The embodiment illustrated in FIG. 1 is shown along with three axes for illustrative purposes: a longitudinal axis 110 that extends between the two mounting blocks 103 and 104 of the handle 101, a vertical axis 111 that extends from the liftable element 102 towards the handle 101, and a transverse axis 112 that is perpendicular to axes 110 and 111.

Figure 2:
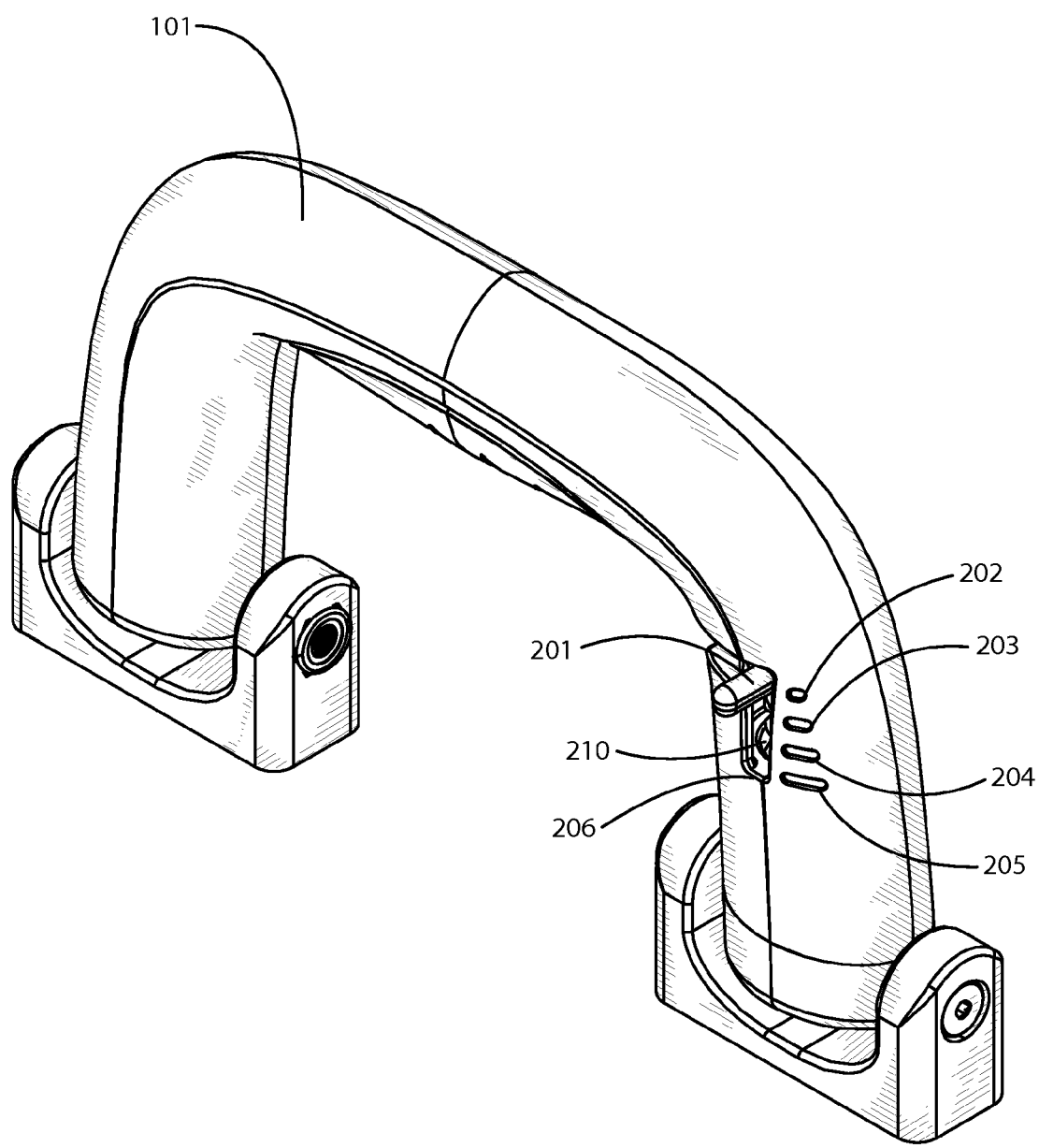
FIG. 2 illustrates various tactile elements of an embodiment of the invention, specifically a tactile force indicator and tactile level indictors on the handle.

FIG. 2 shows a detailed view of handle 101 of the embodiment illustrated in FIG. 1. Incorporated into handle 101 is force detection element 210, which in this embodiment is a compression spring housed inside the handle body. Other embodiments may use other types of force detection elements such as elastic bands, torsion springs, gas or liquid pistons, piezoelectric pressure sensors, or any other mechanism that can sense an attached weight using a measurable physical property. Coupled to force detection element 210 is tactile force indicator 201. In the embodiment shown in FIG. 2, the force indicator 201 may move vertically up and down handle 101 in the vertical groove on the side of the handle as the weight of the attached object varies. Force indicator 201 is tactile because it is of a shape and size that it can be detected by touch. In the embodiment shown, tactile force indicator 201 includes a protrusion that extends from the handle; it is therefore simple for a user to feel the position of the indicator 201 and to locate this position by sliding a hand or finger along the handle. Other embodiments may use other sizes and shapes of force indicators. In some embodiments the force indicator 201 may have a texture that is different from the surrounding handle material to assist with tactile location of the indicator. For example, the force indicator may have a rough surface to distinguish it from a smooth surface of the rest of the handle. In other embodiments the force indicator 201 may have a different elasticity from the surrounding handle material. For example, the force indicator may consist of a pliable rubber material, while the surrounding handle material may be metal. In some embodiments the force indicator 201 may include braille symbols that identify it; for example the force indicator may be engraved with symbols indicating "W" or "weight" or any other label or symbol. In one or more embodiments, the force indicator may move vertically as shown, or with modifications, horizontally, diagonally, rotationally, in or out, or in any direction or directions in response to changes in weight, for example by changing the shape of the channel in which force indicator 201 travels. In some embodiments the tactile force indicator may remain in the same position but it may change its size, shape, texture or elasticity in response to changes in weight.

The embodiment shown in FIG. 2 also has tactile level indicators that form a gauge for the measured weight of the liftable element. In FIG. 2 the tactile level indicators are the slots 202, 203, 204, and 205 on the handle. These level indicators are tactile because they can be sensed with touch. In the embodiment shown the sensing of the level indicators uses the recessed shape of the indicators relative to the surface of the handle. Other embodiments may use ridges instead of slots, or combinations of ridges and slots, or more generally may use any shapes or sizes or textures that can be felt by the user. Embodiments may use any number of tactile level indicators. For example, one or more embodiments may use only a single level indicator that indicates that the weight is excessive relative to some standard or regulation. In the embodiment shown in FIG. 2, the slots 202, 203, 204, and 205 each have a different width. The different widths of these force indicators help the user identify the level using relative size, which can be detected using touch. Other embodiments may use other methods to indicate the relative weight associated with each different level indicator. For example, level indicators may have different sizes, shapes, textures, or elasticities. In one or more embodiments level indicators may include braille symbols for the weight associated with the indicator. In some embodiments the level indicators may be identical, and the user may determine the level by counting the number of indicators between the start of the gauge and the force indicator, using touch.

In the embodiment shown in FIG. 2, force indicator 201 moves down handle 101 inside the vertical slot adjacent to level indicators 202, 203, 204, and 205. As the weight of the attached object increases, the force indicator 201 moves closer to the bottom of the slot as force is applied upward via the handle. At a limiting weight, force indicator 201 will come in contact with the bottom surface 206 of the vertical slot. At this limiting weight and at higher weights the load of the attached liftable element will be borne by the contact force between force indicator 201 and the surface 206, rather than by the force detector. This mechanism therefore limits the maximum weight applied to the force detector. It has the additional benefit of providing a safety mechanism in the event that the force detector breaks or comes out of position. For example, in the embodiment shown in FIG. 2, if the force detector spring breaks, the force indicator 201 will fall to the bottom surface 206 and the contact force will hold the load. Other embodiments may use different mechanisms to limit the maximum force applied to the force detector, and to provide a safety mechanism if the force detector breaks. For example, in some embodiments there may be other surfaces, such as surfaces internal to the handle, that limit the motion of the force indicator instead of or in addition to the bottom surface 206 of the vertical slot. Other embodiments may use safety straps or cables with a maximum extension that are attached between the handle and the liftable element; such safety straps or cables may be configured to not impede the extension of the force detector until the maximum extension is reached. One or more embodiments may use a combination of methods to limit the maximum force on the force detector and to provide integrity and safety if the force detector breaks.

Figure 3:
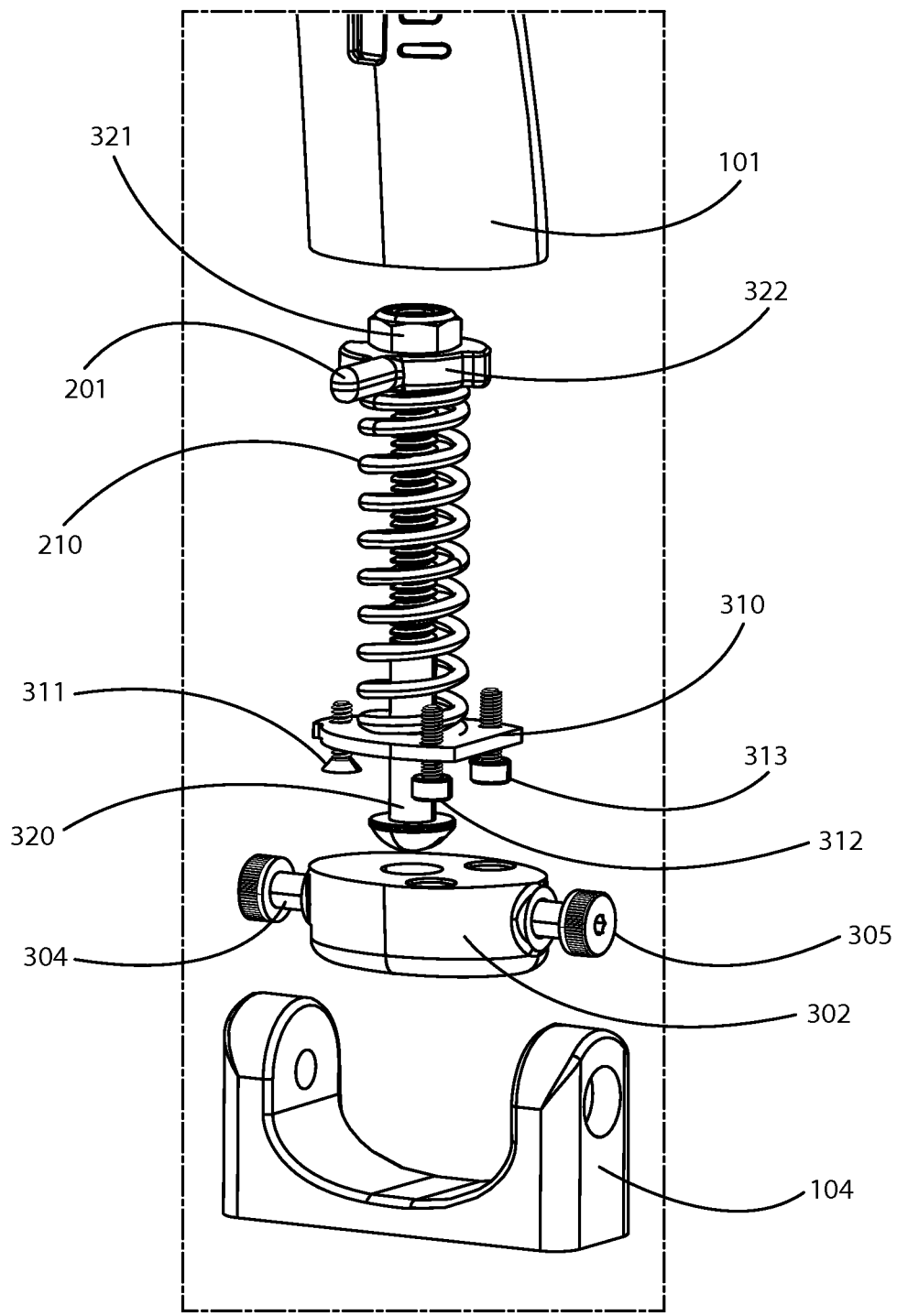
FIG. 3 shows an exploded view of the force detection element of the embodiment of FIG. 2 and mechanisms that couple the force detection element to the handle.

FIG. 3 illustrates a detailed, exploded view of components of the force detector and the handle from the embodiment shown in FIG. 2. Only the right side of the handle 101 is shown. The right side of handle 101 includes a top handle section, bottom handle section 302, and right mounting block 104. Bottom handle section 302 is attached to mounting block 104 using bolts 304 and 305, and mounting block 104 is attached to the liftable element. Force detector 210 in the embodiment shown is a coiled spring that compresses under load from the liftable element. Other embodiments may use other mechanisms for force detection, such as for example extension springs, torsion springs, elastic bands, gas or liquid pistons, or purely electronic devices. Spring 210 is compressed between annular element 322 at the top of the spring, and spring retention plate 310 at the bottom of the spring. Attached to annular element 322 is force indicator 201. Spring retention plate 310 is attached to the top section of handle 101 using bolts 311, 312, and 313. Annular element 322 is not rigidly attached to the top handle section; instead it is coupled to bottom handle section 302, and hence to the liftable element. The coupling of 322 to 302 is via bolt 320 which is inserted through the bottom of 302, and which extends upwards into the upper handle section and through the annular element 322, terminated in nut 321. The weight of the attached liftable element therefore pulls downward on bottom handle section 302, which pulls bolt 320 downwards and in turn pulls annular element 322 downwards. Spring 210 is therefore compressed since the spring retention plate 310 keeps the spring inside the upper handle section of handle 101.

The embodiment illustrated in FIG. 3 uses a force detector 210 that is internal to the handle, and specifically that is internal to the upper section of handle 101. This design offers a benefit that the spring mechanism is isolated from the user. Such a design may offer greater compactness, and it may offer a safety benefit in that a broken spring is not a direct risk to the user. Other embodiments may have force detectors that are external to the handle, or that form a continuous part of the handle.

Figure 4:
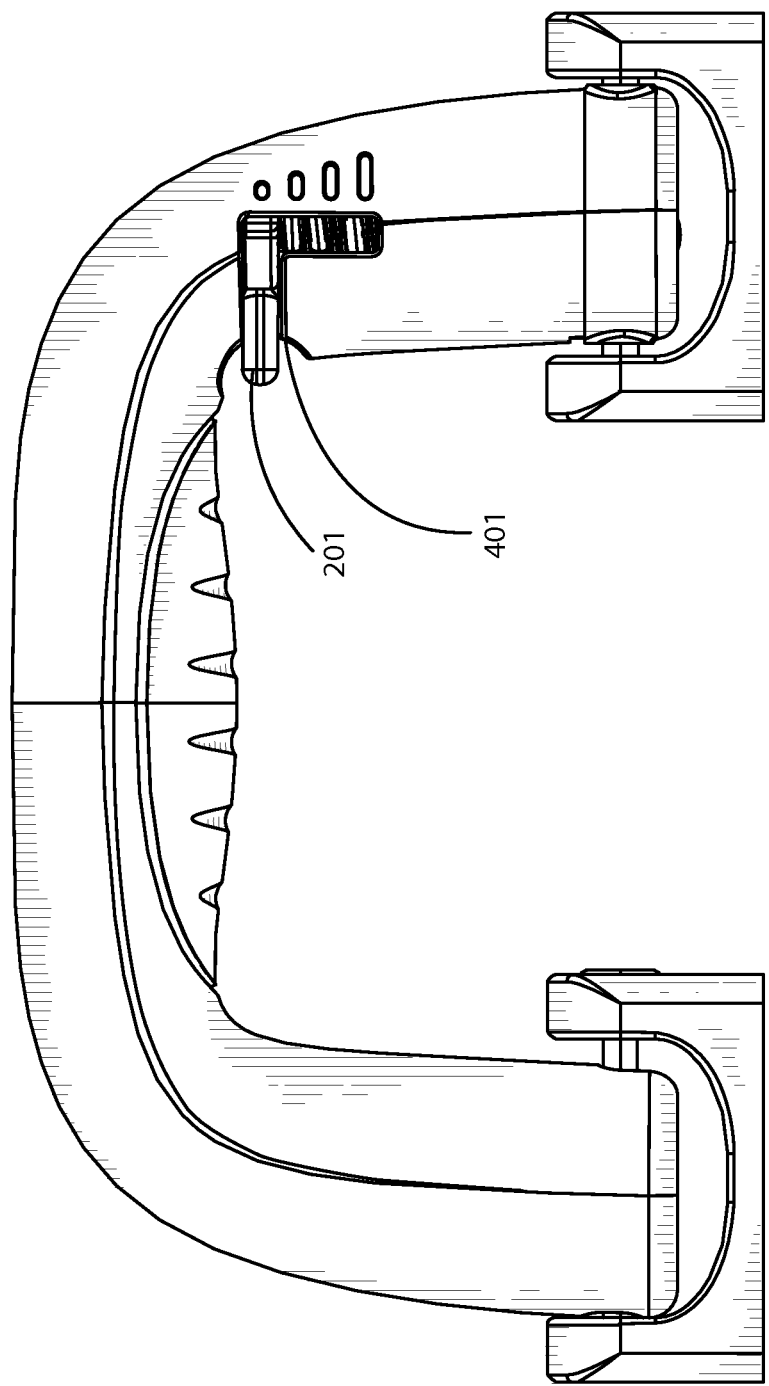
FIG. 4 illustrates an embodiment of the invention with a moveable switch that can turn on or off the force detection feature, shown here in the detection off or "locked" position.

One or more embodiments of the invention may include a moveable switch that may enable or disable the weight measurement feature of the handle. One such embodiment is illustrated in FIG. 4. In this embodiment the tactile force indicator 201 can be rotated 90 degrees from an orientation in the transverse axis of the handle to an orientation in the longitudinal axis of the handle. FIG. 4 shows force indicator 201 after such a rotation. When rotated to the longitudinal axis, force indicator 201 is in contact with surface 401 of the handle; it is therefore unable to move downward. Contact force between 201 and 401 supports the liftable object in this position, and the force detector is decoupled from the load. This rotated position is therefore a measurement-off position that disables the weight measurement feature. When the force indicator 201 is rotated back to the transverse axis, as is shown for example in FIG. 2, the force indicator is free to move vertically and it is in a measurement-on position.

In the embodiment shown in FIG. 4, the force indicator and the moveable switch are common parts. Other embodiments may decouple these functions and have a force indicator and a separate moveable switch to enable or disable weight measurement.

Figure 5:
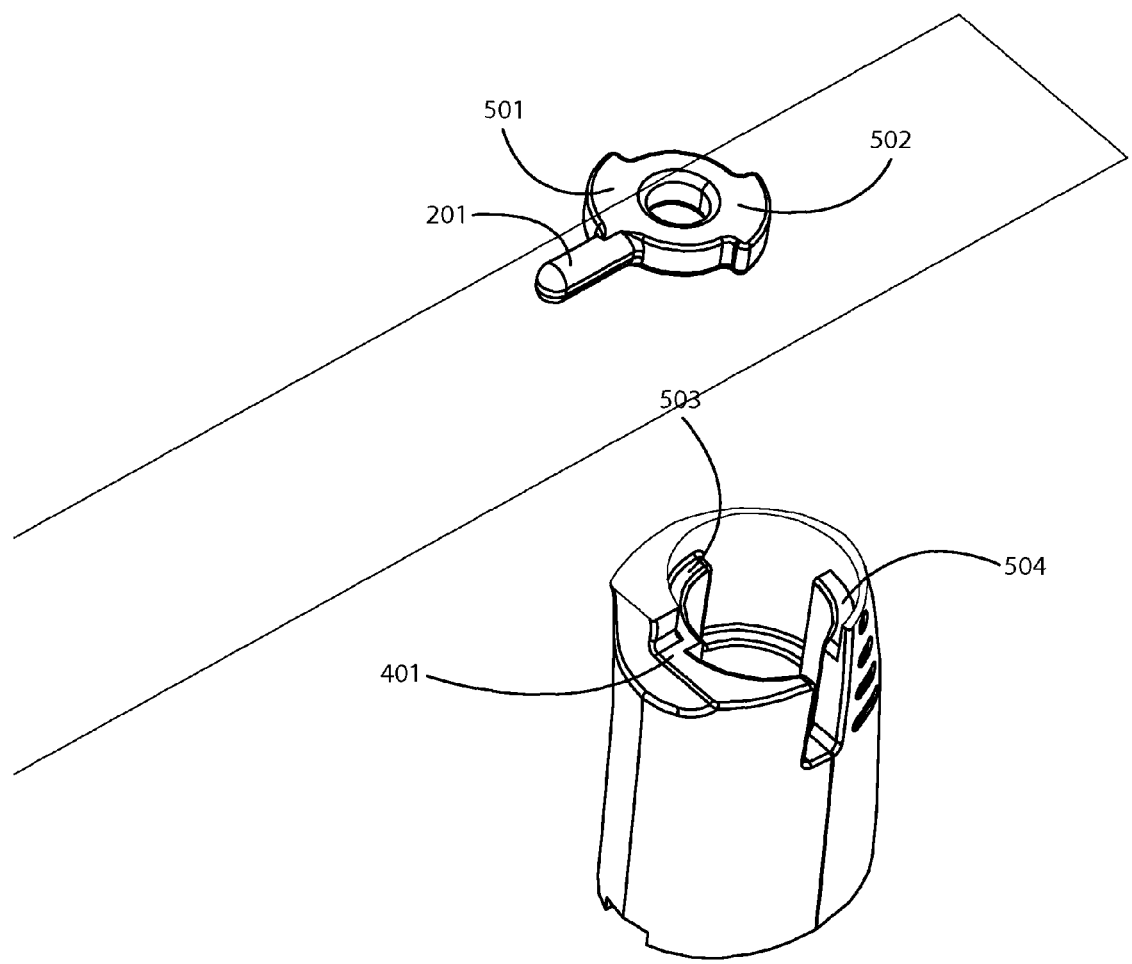
FIG. 5 illustrates details of an embodiment that can lock out force detection, shown as a cross section and exploded view of the portion of the handle that disables force detection.

FIG. 5 illustrates a detailed exploded view of the force indicator and the handle of the embodiment of FIG. 4, with the handle shown in a sectioned view along the horizontal plane. This view illustrates that when the force indicator 201 is rotated to the measurement-off position, e.g., the locked position, multiple surfaces of the annular element attached to 201 are placed into contact with inner surfaces of the handle. In particular, section 501 of the annular element contacts inner surface 503 of the handle, and section 502 of the annular element contacts inner surface 504 of the handle. In addition the force indicator 201 contacts surface 401 of the handle. The particular shape and design of this embodiment therefore provides a strong resistance force against downward movement when in the measurement-off position, due to the contact of multiple surfaces. The shape of the annular element in this embodiment has surfaces at different outer diameters, allowing it to provide a locking function when rotated in one orientation, but to travel freely down the handle when rotated in another orientation.

Figure 6:
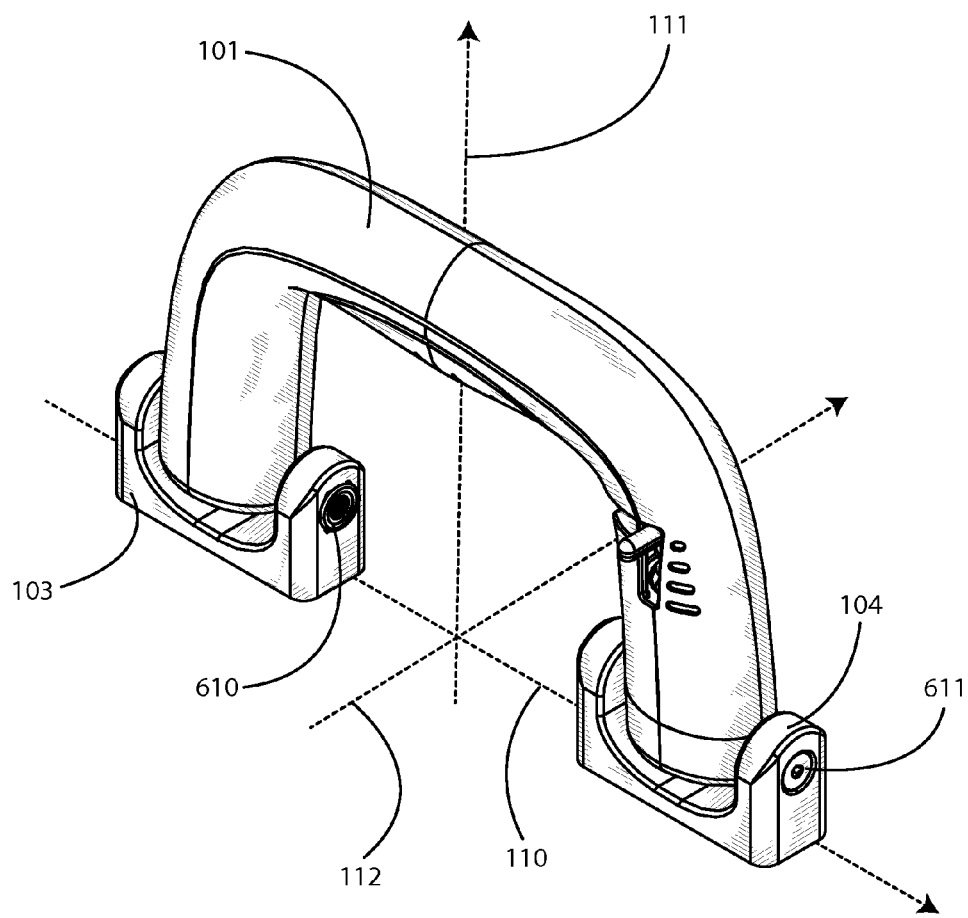
FIG. 6 illustrates an embodiment of the invention that allows the handle to rotate relative to the object it is carrying.

FIG. 6 illustrates an embodiment in which the handle can rotate along the longitudinal axis relative to the liftable element. For example, one or more embodiments of the invention provide rotating linkages between the handle and the liftable element, so that the orientation of the handle relative to the liftable element may be changed. In this embodiment the handle 101 has a top section, and two bottom mounting blocks 103 and 104. Mounting blocks 103 and 104 are coupled to the liftable element (which is not shown). The mounting blocks have through-holes along the longitudinal axis 110. In the embodiment shown, bolt 610 couples mounting block 103 to the top section of handle 101, and bolt 611 couples mounting block 104 to top section of handle 101. If the through-holes in mounting blocks 103 and 104 are sufficiently wide and smooth, top handle element will be free to rotate around longitudinal axis 110.

In other embodiments of the invention, the handle may include rotating linkages that permit free rotation of the top handle section along the transverse axis 112. For example, in one or more embodiments the orientation of mounting blocks 103 and 104 may be rotated by 90 degrees, so that bolts 610 and 611 are orientated along the transverse axis. These linkages would permit free rotation around the transverse axis, provided that the design of the top handle does not over constrain the rotation. For example, in one or more embodiments the top handle may have the form of a parallelogram with free rotation along each vertex; such embodiments would permit top handle elements to rotate in the transverse axis.

One or more embodiments may include dual rotation linkages between the top handle element and one or more of the bottom handle elements. These dual rotation linkages may permit free rotation of the top handle element relative to the bottom handle around multiple axes, for example around both of the longitudinal and transverse axes. Embodiments may employ any of a number of known linkages that provide rotation along multiple axes, such as universal joint linkages, combinations of linkages in series, or ball and socket linkages. Some embodiments may also employ linkages that permit rotation around the vertical axis, or linkages that provide rotation around any number or combination of axes.

Figure 7:
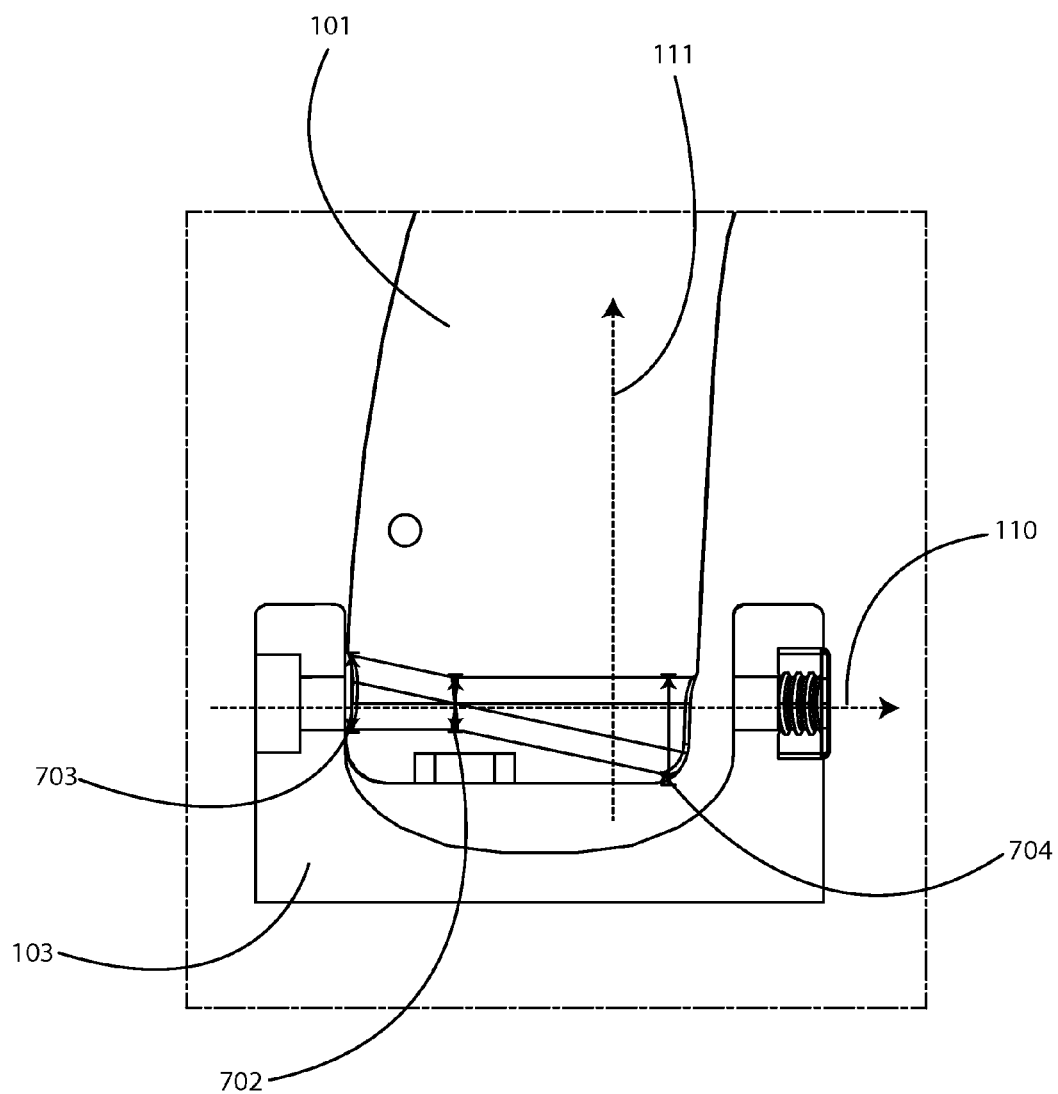
FIG. 7 illustrates a close up sectional view of an embodiment of the invention that allows the handle to rotate in two different axes relative to the liftable object.

FIG. 7 illustrates an embodiment of the invention with a dual rotation linkage using a single bolt with a non-uniform bolt hole. FIG. 7 is a sectional view of the left side of handle 101 and of left mounting block 103, with a section taken along the vertical plane defined by longitudinal axis 110 and vertical axis 111. Transverse axis 112 is not shown as it is perpendicular to the plane of FIG. 7. Cylindrical bolt 610 (as shown in FIG. 6, but omitted from the sectional view of FIG. 7) passes through a bolt hole to couple 103 to the top section of 101. The top handle section can rotate freely around the longitudinal axis if the bolt hole is sufficiently wide that bolt 610 does not bind in the hole. The diameter of the bolt hole is not uniform; it is wider on the edges than in the center. In the embodiment shown, left hole diameter 703 and right hole diameter 704 are both greater than middle hole diameter 702. These additional gaps in the hole at the ends allow the top section of the handle to tilt around the transverse axis to the extent provided by the wider diameters of the bolt hole at the ends. This tilting around the transverse axis offers a benefit that the top handle can remain in a stationary orientation as the bottom handle and the liftable element rotate. In some embodiments the expansion or contraction of the force detector causes the length of one side of the handle to grow or shrink relative to the other side of the handle, which causes the liftable element to tilt relative to the top handle. An embodiment with a linkage that provides for relative rotation around for example the transverse axis allows for such a change in the relative length of the two sides of the handle. Without such a mechanism it is possible that the handle would be overconstrained relative to the liftable element, making it difficult or impossible for the force detector to expand or contract.

While the ideas herein disclosed has been described by means of specific embodiments and applications thereof, numerous modifications and variations could be made thereto by those skilled in the art without departing from the scope of the invention set forth in the claims.

What is claimed is:

1. A tactile handle integrated scale comprising:
 a handle having two ends wherein each end is attached to a liftable element, wherein said handle comprises
  a longitudinal axis that extends from one of said two ends of said handle towards a second end of said two ends of said handle,
  a vertical axis that extends from said liftable element towards said handle, and
  a transverse axis that is perpendicular to said longitudinal axis and to said vertical axis;
 a force detector having a first detector end and a second detector end, wherein
  said first detector end and said second detector end are each coupled with said handle,
  said force detector comprises a measurable physical property that changes as a function of a force between said first detector end and said second detector end,
  said handle is configured to limit a maximum force applied to said force detector, and
  said handle is configured to support said liftable element if said force detector breaks;
 a tactile force indicator coupled with said force detector, wherein
  a position or orientation of said tactile force indicator relative to said handle depends on said measurable physical property of said force detector,
  said tactile force indicator comprises a force indicator tactile characteristic that allows a user to locate and recognize said tactile force indicator using touch, wherein said force indicator tactile characteristic comprises one or more of
   a size of said tactile force indicator,
   a shape of said tactile force indicator,
   a texture of said tactile force indicator,
   an elasticity of said tactile force indicator;
 a gauge configured to couple with said handle, wherein said gauge comprises one or more tactile level indicators, each having a level indicator tactile characteristic that allows a user to locate and recognize said one or more tactile level indicators using touch, wherein said level indicator tactile characteristic comprises one or more of
- a size of said tactile level indicator,
- a shape of said tactile level indicator,
- a texture of said tactile level indicator,
- an elasticity of said tactile level indicator; and, a moveable switch with measurement-on position and a measurement-off position, wherein said moveable switch and said tactile force indicator comprise common parts, and wherein
- when said moveable switch is placed in said measurement-on position, a weight of said liftable element is coupled to said force detector, and said measurable physical property of said force detector changes as a function of said weight of said liftable element; and,
- when said moveable switch is placed in said measurement-off position, said weight of said liftable element is uncoupled from said force detector and is coupled to a linkage coupling said two ends of said handle, and said measurable physical property of said force detector does not change as a function of said weight of said liftable element.

2. The tactile handle integrated scale of claim 1 wherein said force detector is a spring.

3. The tactile handle integrated scale of claim 2 wherein
said spring is compressed in proportion to said weight of said liftable element; and,
said measurable physical property of said force detector is a compressed length of said spring.

4. The tactile handle integrated scale of claim 2 wherein said spring is internal to said handle.

5. The tactile handle integrated scale of claim 1 wherein at least one of said one or more tactile level indicators comprise a slot in said handle or a ridge on said handle.

6. The tactile handle integrated scale of claim 1 wherein said tactile force indicator or said one or more tactile level indicators or both comprise braille symbols.

7. The tactile handle integrated scale of claim 1 wherein said tactile force indicator comprises an element protruding from said handle.

8. The tactile handle integrated scale of claim 1, further comprising one or more transverse pivoting linkages between said two ends of said handle and said liftable element, wherein said one or more transverse pivoting linkages are configured to permit rotation of said liftable element relative to said handle around said transverse axis.

9. The tactile handle integrated scale of claim 1 further comprising one or more longitudinal pivoting linkages between said two ends of said handle and said liftable element, wherein said one or more longitudinal pivoting linkages are configured to permit rotation of said liftable element relative to said handle around said longitudinal axis.

10. The tactile handle integrated scale of claim 8 further comprising one or more longitudinal pivoting linkages between said two ends of said handle and said liftable element, wherein said one or more longitudinal pivoting linkages are configured to permit rotation of said liftable element relative to said handle around said longitudinal axis.

11. The tactile handle integrated scale of claim 10 wherein said handle comprises a top handle element and one or more bottom handle elements, wherein
said one or more bottom handle elements are coupled to said liftable element; and,
said one or more bottom handle elements are coupled to said top handle element with one or more dual rotation linkages that permit rotation around both of said longitudinal axis and said transverse axis.

12. The tactile handle integrated scale of claim 11 wherein at least one of said one or more dual rotation linkages comprise a cylindrical element inserted through a hole, wherein
a minimum diameter of said hole is greater than a diameter of said cylindrical element, wherein said cylindrical element can rotate along its long axis inside said hole; and,
the minimum diameter of said hole is greater on both of its ends than in of said hole, wherein said cylindrical element can rotate within said hole along an axis perpendicular to said long axis of said cylindrical element.

13. A tactile handle integrated scale comprising:
a handle having two ends wherein each end is attached to a liftable element, wherein said handle comprises
- a longitudinal axis that extends from one of said two ends of said handle towards a second end of said two ends of said handle,
- a vertical axis that extends from said liftable element towards said handle,
- a transverse axis that is perpendicular to said longitudinal axis and to said vertical axis,
- two bottom handle elements located at each of said two ends and coupled to said liftable element,
- a top handle element coupled to said two bottom handle elements;

a spring having a first detector end and a second detector end, wherein
- said spring is housed within an outer surface of said handle,
- said first detector end and said second detector end are each coupled with said handle,
- a length of said spring changes as a function of a force between said first detector end and said second detector end,
- said handle is configured to limit a maximum force applied to said spring, and
- said handle is configured to support said liftable element if said spring breaks;

a tactile force indicator coupled with said spring, wherein
- a position or orientation of said tactile force indicator relative to said handle depends on said length of said spring,
- said tactile force indicator incorporates a protrusion extending outward from said handle that allows a user to locate and recognize said tactile force indicator using touch;

a gauge configured to couple with said handle, wherein said gauge comprises one or more tactile level indicators, each of which incorporates a slot in said handle or a ridge extending from said handle that allows a user to locate and recognize said one or more tactile level indicators using touch;

a moveable switch with a measurement-on position and a measurement-off position, wherein
- when said moveable switch is placed in said measurement-on position, weight of said liftable element is coupled to said spring, and said length of said spring changes as a function of said weight of said liftable element; and
- when said moveable switch is placed in said measurement-off position, said weight of said liftable element is uncoupled from said spring and is coupled to a linkage coupling said two ends of said handle, and said length of said spring does not change as a function of said weight of said liftable element; and, a dual rotation linkage between at least one of said two bottom handle elements and said top handle element, comprising a cylindrical element inserted through a hole, wherein
a minimum diameter of said hole is greater than a diameter of said cylindrical element, wherein said cylindrical element can rotate along its long axis inside said hole, and,
the minimum diameter of said hole is greater on both of its ends than in a middle of said hole, wherein said cylindrical element can rotate within said hole along an axis perpendicular to said long axis of said cylindrical element.

14. A tactile handle integrated scale comprising:
a handle having two ends wherein each end is attached to a liftable element, wherein said handle comprises
a longitudinal axis that extends from one of said two ends of said handle towards a second end of said two ends of said handle,
a vertical axis that extends from said liftable element towards said handle, and
a transverse axis that is perpendicular to said longitudinal axis and to said vertical axis;
one or more transverse pivoting linkages between said two ends of said handle and said liftable element, wherein said one or more transverse pivoting linkages are configured to permit rotation of said liftable element relative to said handle around said transverse axis;
a force detector having a first detector end and a second detector end, wherein
said first detector end and said second detector end are each coupled with said handle,
said force detector comprises a measurable physical property that changes as a function of a force between said first detector end and said second detector end,
said handle is configured to limit a maximum force applied to said force detector, and
said handle is configured to support said liftable element if said force detector breaks;
a tactile force indicator coupled with said force detector, wherein
a position or orientation of said tactile force indicator relative to said handle depends on said measurable physical property of said force detector,
said tactile force indicator comprises a force indicator tactile characteristic that allows a user to locate and recognize said tactile force indicator using touch, wherein said force indicator tactile characteristic comprises one or more of
a size of said tactile force indicator,
a shape of said tactile force indicator,
a texture of said tactile force indicator,
an elasticity of said tactile force indicator; and,
a gauge configured to couple with said handle, wherein said gauge comprises one or more tactile level indicators, each having a level indicator tactile characteristic that allows a user to locate and recognize said one or more tactile level indicators using touch, wherein said level indicator tactile characteristic comprises one or more of
a size of said tactile level indicator,
a shape of said tactile level indicator,
a texture of said tactile level indicator,
an elasticity of said tactile level indicator.

15. The tactile handle integrated scale of claim 14 further comprising one or more longitudinal pivoting linkages between said two ends of said handle and said liftable element, wherein said one or more longitudinal pivoting linkages are configured to permit rotation of said liftable element relative to said handle around said longitudinal axis.

16. The tactile handle integrated scale of claim 15 wherein said handle comprises a top handle element and one or more bottom handle elements, wherein
said one or more bottom handle elements are coupled to said liftable element; and,
said one or more bottom handle elements are coupled to said top handle element with one or more dual rotation linkages that permit rotation around both of said longitudinal axis and said transverse axis.

17. The tactile handle integrated scale of claim 16 wherein at least one of said one or more dual rotation linkages comprise a cylindrical element inserted through a hole, wherein
a minimum diameter of said hole is greater than a diameter of said cylindrical element, wherein said cylindrical element can rotate along its long axis inside said hole; and
the minimum diameter of said hole is greater on both of its ends than in a middle of said hole, wherein said cylindrical element can rotate within said hole along an axis perpendicular to said long axis of said cylindrical element.

18. A tactile handle integrated scale comprising:
a handle having two ends wherein each end is attached to a liftable element, wherein said handle comprises
a longitudinal axis that extends from one of said two ends of said handle towards a second end of said two ends of said handle,
a vertical axis that extends from said liftable element towards said handle, and
a transverse axis that is perpendicular to said longitudinal axis and to said vertical axis;
one or more longitudinal pivoting linkages between said two ends of said handle and said liftable element, wherein said one or more longitudinal pivoting linkages are configured to permit rotation of said liftable element relative to said handle around said longitudinal axis;
a force detector having a first detector end and a second detector end, wherein
said first detector end and said second detector end are each coupled with said handle,
said force detector comprises a measurable physical property that changes as a function of a force between said first detector end and said second detector end,
said handle is configured to limit a maximum force applied to said force detector, and
said handle is configured to support said liftable element if said force detector breaks;
a tactile force indicator coupled with said force detector, wherein
a position or orientation of said tactile force indicator relative to said handle depends on said measurable physical property of said force detector,
said tactile force indicator comprises a force indicator tactile characteristic that allows a user to locate and recognize said tactile force indicator using touch, wherein said force indicator tactile characteristic comprises one or more of
a size of said tactile force indicator,
a shape of said tactile force indicator,
a texture of said tactile force indicator,
an elasticity of said tactile force indicator;
a gauge configured to couple with said handle, wherein said gauge comprises one or more tactile level indicators, each having a level indicator tactile characteristic that allows a user to locate and recognize said one or more tactile level indicators using touch, wherein said level indicator tactile characteristic comprises one or more of
a size of said tactile level indicator,
a shape of said tactile level indicator,
a texture of said tactile level indicator,
an elasticity of said tactile level indicator.

* * * * *